United States Patent [19]

Tsujimura et al.

[11] 4,440,141

[45] Apr. 3, 1984

[54] METHOD AND APPARATUS FOR CONTROLLING ENERGIZING INTERVAL OF IGNITION COIL OF AN INTERNAL COMBUSTION ENGINE

[75] Inventors: Masakuni Tsujimura, Anjyo; Hideo Miyagi, Okazaki; Mamoru Kohashi, Aichi; Masaaki Kurii, Toyoake, all of Japan

[73] Assignees: Nippondenso Co., Ltd., Kariya; Toyota Jidosha Kogyo Kabushiki Kaisha, Toyota, both of Japan

[21] Appl. No.: 247,553

[22] Filed: Mar. 25, 1981

[30] Foreign Application Priority Data

Mar. 26, 1980 [JP] Japan ................................. 55-39540

[51] Int. Cl.³ .............................................. F02P 9/00
[52] U.S. Cl. ..................................... 123/609; 123/625
[58] Field of Search ................ 123/609, 610, 611, 625

[56] References Cited

U.S. PATENT DOCUMENTS

| | | | |
|---|---|---|---|
| 4,225,925 | 9/1980 | Hattori et al. | 123/609 |
| 4,267,813 | 5/1981 | Hohne et al. | 123/625 |
| 4,309,973 | 1/1982 | Tamura | 123/611 |

*Primary Examiner*—Andrew M. Dolinar
*Attorney, Agent, or Firm*—Cushman, Darby & Cushman

[57] ABSTRACT

Energizing interval of an ignition coil, which is basically determined on the basis of the rotational speed of an engine, is corrected by adding thereto an extension amount which is either a function of the rotational speed of the engine or a given upper limit value at the rotational speed of the engine when accelerating condition is detected. Thus, the ignition coil is supplied with a primary winding current for a desired interval even during acceleration so that sufficient ignition voltage will be produced to properly ignite air/fuel mixture in engine cylinders. The extended energizing interval is then reduced stepwise to provide normal energizing interval during engine operations other than acceleration.

11 Claims, 12 Drawing Figures

MAIN ROUTINE

INTERRUPT ROUTINE BY AN ACCELERATING PULSE

INTERRUPT ROUTINE FOR IGNITION

4,440,141

METHOD AND APPARATUS FOR CONTROLLING ENERGIZING INTERVAL OF IGNITION COIL OF AN INTERNAL COMBUSTION ENGINE

BACKGROUND OF THE INVENTION

This invention generally relates to a method and apparatus for controlling energizing interval of an ignition coil of an internal combustion engine, and more particularly, the present invention relates to such a method and apparatus for increasing the energizing interval during acceleration of the engine which is equipped with an electronic control device.

Generally speaking, conventional electronic control systems for internal combustion engines comprise various sensors, such as a rotational angle sensor, a reference position sensor, coolant temperature sensor, suction vacuum sensor, ambient air pressure sensor, acceleration sensor and the like, which detect the operating condition of the engine; a control unit for obtaining various amounts to be controlled, such as ignition timing, energizing interval of the ignition coil, fuel injecting interval, the amount of exhaust gas recirculation (EGR) and the like by using, for instance, a microcomputer, in accordance with the information from the sensors; and various actuators, such as an ignition device, an EGR control valve, a fuel injection device and the like, which control the operating condition of the engine in accordance with the control amounts from the control unit.

In the above-mentioned conventional electronic control system, the energizing interval of the ignition coil is determined by detecting the rotational speed of the engine crankshaft. Namely, the energizing interval decreases as the engine rpm increases. However, when the engine is accelerated, the actual energizing interval is apt to be shorter than a desired interval, as will be described hereinlater, in the conventional devices. Because of the shorter energizing interval, the ignition coil cannot produce a sufficient voltage for properly igniting the air/fuel mixture in the cylinders of the engine. Although it is theoretically possible to set a basic value of the energizing interval longer in advance so that the energizing interval during acceleration is sufficient, such a longer energizing interval may cause the final stage transistor and the ignition coil, both included in the ignition device, to generate undesirable heat, resulting in deterioration of these elements because an electric current flows through the transistor and the ignition coil for an interval longer than required during normal or steady operating condition of the engine.

SUMMARY OF THE INVENTION

The present invention has been developed in order to remove the above-mentioned disadvantages and drawbacks inherent to the conventional method and apparatus for controlling the energizing interval of an ignition coil of an internal combustion engine.

It is, therefore, a primary object of the present invention to provide a method and apparatus for controlling energizing interval of an ignition coil of an internal combustion engine so that the ignition coil is being energized for a most suitable interval irrespective of the operating condition of the engine.

Another object of the present invention is to provide such a method and apparatus so that air/fuel mixture in the cylinders of the engine is securely ignited.

A further object of the present invention is to provide such a method and apparatus so that undesirable heat is not generated in the final stage transistor of the ignition device and in the ignition coil.

According to the present invention accelerating condition of an internal combustion engine is first detected, and then amount of necessary extension of the energizing interval is obtained to be added to an original or basic energizing interval, which has been obtained in the same manner as in the conventional manner, so that the ignition coil will be energized for a desired period of time even in the accelerating condition of the engine, providing a sufficient voltage to the spark plugs.

BRIEF DESCRIPTION OF THE DRAWINGS

These and other objects and features of the present invention will become more readily apparent from the following detailed description of the preferred embodiment taken in conjunction with the accompanying drawings in which:

FIGS. 7 to 9A and 9B are graphs showing various characteristics of the operation of the ignition timing control system according to the present invention.

DETAILED DESCRIPTION OF THE PREFERRED EMBODIMENT

Prior to describing the present invention, a conventional electronic ignition timing control system will be described for a better understanding of the objects and features of the present invention with reference to FIGS. 1 and 2.

Figure 1:
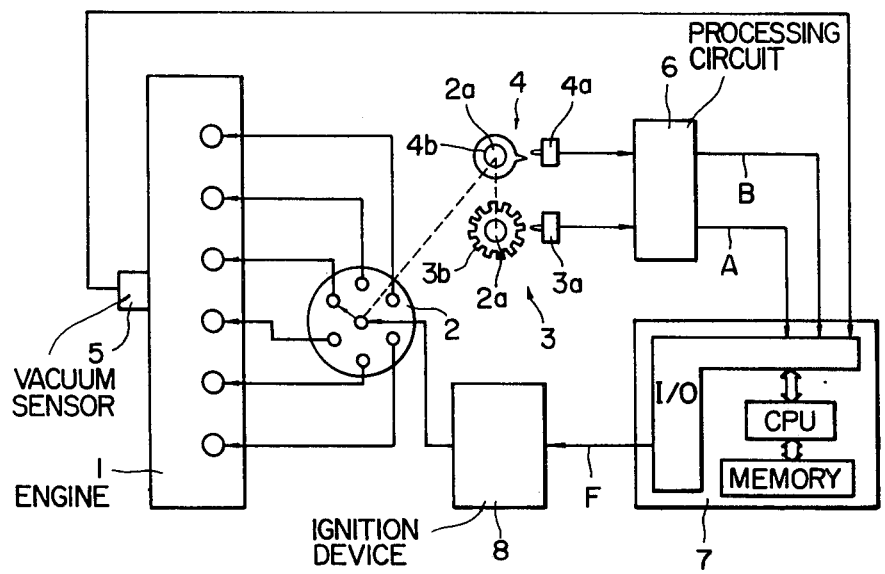
FIG. 1 is a schematic view of a conventional electronic ignition timing control system.

FIG. 1 is a schematic view of a conventional electronic ignition timing control system for an internal combustion engine. In FIG. 1, an internal combustion engine of in-line 6-cylinder type is designated at a reference 1, and has six spark plugs (no numeral). An ignition distributor 2 has a rotatable contact which is arranged to be in contact with one of six stationary contacts respectively connected to the spark plugs, where the rotatable contact is connected to an ignition device 8 for receiving a high voltage. A rotational angle sensor 3 and a reference position sensor 4 are both incorporated in the distributor 2. The rotational angle sensor 3 comprises a signal rotor 3b, which is a toothed wheel fixed to a rotary shaft 2a of the distributor 2, and an electromagnetic pickup 3a, while the reference position sensor 4 comprises a signal rotor 4b having a projection and is fixed to the rotary shaft 2a, and an electromagnetic pickup 4a. Thus, the pickup 3a of the rotational angle sensor 3 produces twelve pulses per two revolutions of the engine crankshaft, while the pickup 4a of the reference position sensor 4 produces a single pulse during the same period.

The output signals of the sensors 3 and 4 are respectively fed to a processing circuit 6 in which the waveforms of the output signals of the pickups 3a and 4a are respectively shaped to be fed respectively to a control device 7, such as a well known microcomputer having a central processing unit (CPU), memories, input/output devices (I/O) and the like. The control device 7 is also responsive to a signal from a suction vacuum sensor 5, so that necessary ignition timing and energizing interval are respectively calculated in accordance with a predetermined control logic. Namely, the control device 7 emits an output signal which is then fed to the ignition device 8 having an ignition coil and an ignitor. The ignitor is driven by the output signal of the control device 7 so that a primary winding current of the ignition coil is controlled for producing a high voltage across the secondary winding of the same. The high voltage is supplied via the distributor 2 to respective spark plugs of the engine 1 in a given sequence so that combustion takes place in turn in the respective cylinders.

Figure 2:
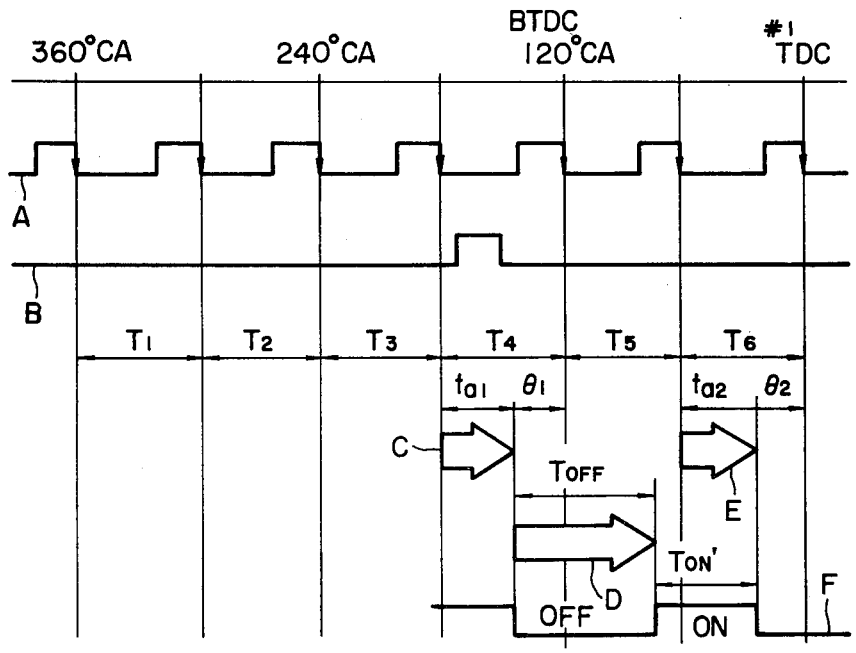
FIG. 2 is a timing chart showing the operation of the system of FIG. 1.

The conventional method for controlling the ignition timing and energizing interval of the ignition coil will be described with reference to a timing chart of FIG. 2, showing various timings with respect to the rotational angle of the crankshaft of the engine 1. One of the output signals of the processing circuit 6, corresponding to the output signal of the rotational angle sensor 3, is indicated at a reference A, while the other output of the processing circuit 6, corresponding to the output signal of the reference position sensor 4, is indicated at a reference B. The signal A has pulses appearing in synchronizm with respective top dead centers (TDC) of respective cylinders, and the pulse interval corresponds to 60 degrees of the crankshaft angle (CA). The signal B has pulses appearing at a position corresponding to before top dead center (BTDC) 150 degrees CA of a first cylinder #1. The control device 7 performs the following operations by detecting the angular position of the pulses, which appear at an interval of 60° CA, of the signal A in view of one of the pulses of the signal B.

Hereinbelow, it will be described the conventional way for controlling the ignition timing and energizing interval for the first cylinder #1 as an example. First, a period of time $(T_1+T_2)$ required for the crankshaft to rotate from BTDC 360° CA to BTDC 240° CA of the first cylinder #1 is obtained by counting the number of clock pulses from a built-in clock pulse generator so that the rotational speed N of the engine crankshaft, i.e. the engine rpm, is detected. Then, an advance angle $\theta_1$ will be obtained by using the rotational speed N and a sensed suction vacuum pressure from the suction vacuum pressure sensor 5 in accordance with a given logic. This advance angle $\theta_1$ will be used for determining the ignition timing for the cylinder one before the first cylinder #1. Furthermore, the energizing interval of the ignition coil, which is expressed in terms of $T_{ON}$, will be obtained by using the rotational speed N as a parameter in accordance with a given logic, and simultaneously, unenergizing interval, which is expressed in terms of $T_{OFF}$ will be obtained by the following Eq. (1).

$$T_{OFF} = (T_1 + T_2) - T_{ON} \quad (1)$$

On the other hand, in order to actually perform ignition on the basis of the operated advance angle $\theta_1$, an ignition count-down interval $t_{a1}$ will be operated in accordance with the following Eq. (2).

$$t_{a1} = (T_1 + T_2) \frac{60° CA - \theta_1}{120° CA} \quad (2)$$

In the above manner, the unenergizing interval $T_{OFF}$ and the ignition count-down interval $t_{a1}$ are both obtained between an interval defined by BTDC 240° CA and BTDC 180° CA, and the respective values thereof will be stored in registers. When a position of BTDC 180° CA is detected, count-down of the register, in which the ignition count-down interval $t_{a1}$ has been stored, is performed as shown by an arrow C in FIG. 2. At a point of finishing count-down so that the contents of the register become zero, namely, after the interval $t_{a1}$ has been passed from the point of BTDC 180° CA, the ignitor driving signal F, i.e. the output signal of the control device 7, turns off to cause the ignition device 8 to perform ignition. After the instant, at which the ignitor driving signal F has turned off, the contents of the other register, in which the unenergizing interval $T_{OFF}$ has been stored, are counted down so that the ignitor driving signal F becomes on after the period $T_{OFF}$ resulting in the energization of the ignition coil as shown by an arrow D.

Meanwhile, during the operation of the ignition timing and the energizing interval of the ignition coil and performance of the ignition of the cylinder one before the first cylinder #1, the advance angle $\theta_2$ of the first cylinder #1 is obtained by using engine rotational speed N, which is obtained by the interval $(T_3+T_4)$ required for the engine crankshaft to rotate from BTDC 240° CA to BTDC° 120° CA, and by the suction vacuum pressure from the suction vacuum sensor 5 as parameters in the same manner as obtaining the advance angle $\theta_1$ for the cylinder one before the first cylinder #1. Therefore, ignition count-down interval $t_{a2}$ for performing the ignition in the first cylinder #1 will be operated as indicated by the following Eq. (3) in the same manner as in Eq. (2).

$$t_{a2} = (T_3 + T_4) \frac{60° CA - \theta_2}{120° CA} \quad (3)$$

By using the ignition count-down interval $t_{a2}$ as indicated by an arrow E, count-down is started from a point of BTDC 60° CA, after the internal $t_{a2}$ has been passed, the ignitor driving signal F turns off to perform ignition of the first cylinder #1.

As described in the above, the ingitor driving signal F for igniting air/fuel mixture in the first cylinder #1 is produced, and the actual energizing interval for the first cylinder #1 is indicated by the following Eq. (4) as is apparent from FIG. 2.

$$T_{ON}' = T_4 + T_5 - t_{a1} - T_{OFF} + t_{a2} \quad (4)$$

Substituting Eqs. (1), (2) and (3) to Eq. (4), $T_{ON}'$ will be given by the following Eq. (5).

$$T_{ON}' = (T_4 + T_5) - (T_1 + T_2) + \frac{1}{120° CA} \{(T_3 + T_4)(60° CA - \theta_2) - (T_1 + T_2)(60° CA - \theta_1)\} + T_{ON} \quad (5)$$

In the case that the engine 1 runs in steady state, namely, when the engine rpm N and suction vacuum pressure are both constant, the following equations are satisfied in the above Eq. (5).

$$T_4+T_5=T_1+T_2=T_3+T_4 \text{ and } \theta_1=\theta_2$$

Therefore, the following equation is obtained.

$$T_{ON}'=T_{ON}$$

In other words, the actual energizing interval $T_{ON}'$ equals the energizing interval $T_{ON}$ which has been obtained by the control device 7, and thus control of the energizing interval can be correctly performed in the electronic control device for an internal combustion engine.

However, the following disadvantage will occur during acceleration of the engine 1 when the energizing interval of the ignition coil is controlled in the above-mentioned conventional manner. During acceleration, namely, when the engine rotational speed N is increasing, the following relationship is formed in Eq. (6).

$$(T_1+T_2)>(T_3+T_4)>(T_4+T_5) \tag{6}$$

Assuming that the advance angle $\theta_2$ has been changed by $\Delta\theta$ with respect to $\theta_1$, i.e.

$$\theta_2=\theta_1+\Delta\theta \tag{7}$$

Therefore, the actual energizing interval $T_{ON}'$ is given by as follows from Eqs. (5) and (7):

$$T_{ON}' = \{(T_4 + T_5) - (T_1 + T_2)\} + \frac{60° CA - \theta_1}{120° CA} \{(T_3 + T_4) - (T_1 + T_2)\} - \frac{\Delta\theta}{120° CA}(T_3 + T_4) + T_{ON} \tag{8}$$

By measuring various values with the engine actually accelerated, the following relationship in Eq. (8) has been recognized:

$$\left|(T_4 + T_5) - (T_1 + T_2) + \frac{60° CA - \theta_1}{120° CA} \{(T_3 + T_4) - (T_1 + T_2)\}\right| >> \frac{\Delta\theta}{120° CA}(T_3 + T_4)$$

Therefore, Eq. (8) can be rewritten as follows, ignoring the third term thereof:

$$T_{ON}' = \{(T_4 + T_5) - (T_1 + T_2)\} + \frac{60° CA - \theta_1}{120° CA} \{(T_3 + T_4) - (T_1 + T_2)\} + T_{ON} \tag{9}$$

Since the value of $\theta_1$ is controlled to be within 60° CA, $$60° CA - \theta_1 \geq 0° CA$$

Furthermore, from Eq. (6):

$$\{(T_4+T_5)-(T_1+T_2)\}<0$$

$$\{(T_3+T_4)-(T_1+T_2)\}<0$$

Therefore, Eq. (9) can be rewritten as:

$$T_{ON}'=T_{ON}-\Delta T_{ON} \tag{10}$$

$$\Delta T_{ON} = (T_4 + T_5) - (T_1 + T_2) + \tag{11}$$

$$\frac{60° CA - \theta_1}{120° CA}\{(T_3 + T_4) - (T_1 + T_2)\}$$

As will be understood from Eqs. (10) and (11), the actual energizing interval $T_{ON}'$ does not equal the energizing interval $T_{ON}$ operated by the control device 7; namely, the former is shorter than the latter by $\Delta T_{ON}$. Generally speaking, in order to obtain a high voltage by an ignition coil, the ignition coil has to be energized for a relatively long period of time. However, as described at the beginning of this specification, longer energizing interval might cause the final stage transistor of the ignitor and the ignition coil to generate undesirable heat. Namely, the energizning interval should be longer than a first given limit and shorter than a second given limit which is greater than the first limit.

Figure 3:
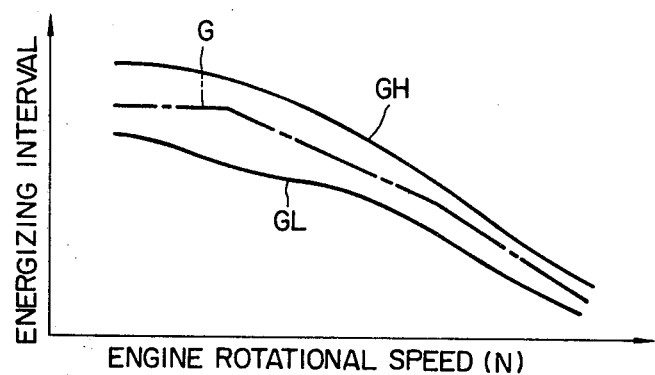
FIG. 3 is a praph showing the variation in energizing interval of the ignition coil of FIG. 1 with respect to engine rotational speed.

FIG. 3 is a graph showing an energizing interval characteristic curve G with respect to the engine rotational speed N. The value of the curve G is used for obtaining the energizing interval $T_{ON}'$ and this value lowers as the engine rotational speed N increases. The value of the curve G is above a required minimum interval, indicated by a solid curve GL, which is for producing a necessary high voltage, and is below a maximum interval, indicated by another solid curve GH, which is determined by the maximum limit allowed in view of the heat generation in the final stage transistor and/or the ignition coil. In other words, the value of the curve G indicative of the energizing interval is determined so that it satisfies both upper and lower limits indicated by the curves GH and GL.

However, when the engine 1 is accelerated, the value of the curve G becomes lower than the value of the curve GL, as described in the above, and therefore, the voltage generated in the ignition coil is insufficient for satisfactorily ignite the air/fuel mixture in the cylinders of the engine 1. As a result, misfire is apt to occur, deteriorating the accelerating characteristic of the engine 1. On the contrary, if the value of the curve G of FIG. 3 were set, in advance, to a value greater than a value which is within a range defined between the upper limit curve GH and the lower limit curve GL, the above-mentioned disadvantages during acceleration would be removed. However, as described hereinbefore, when the engine 1 operates in steady state, the energizing interval exceeds a value of the upper limit curve GL, causing the ignition device 8 to malfunction due to the undesirable heat generation.

Figure 4:
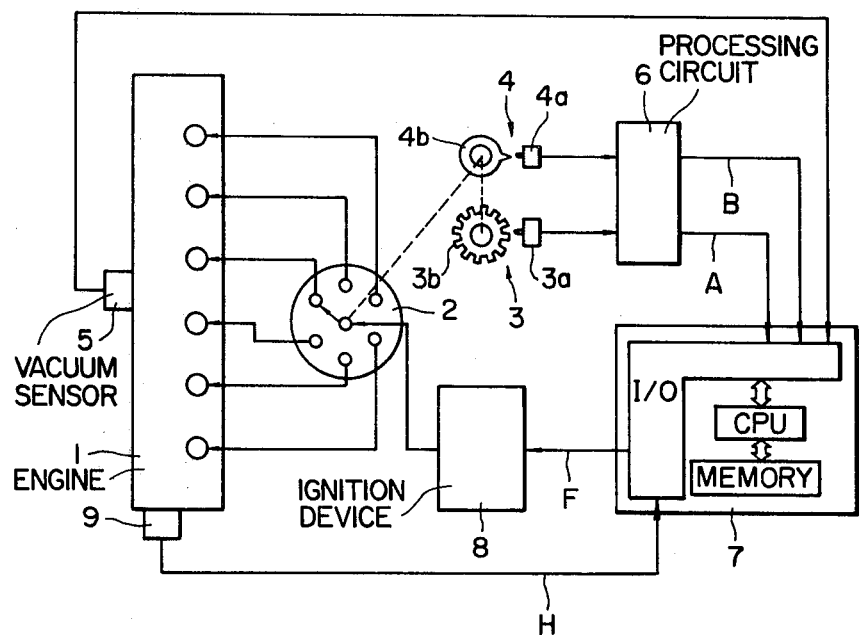
FIG. 4 is a schematic view of the electronic ignition timing control system according to the present invention.

Reference is now made to FIG. 4 which is a schematic view of an electronic ignition timing control device to which the present invention is adapted. In FIG. 4, an internal combustion engine of in-line 6-cylinder type is designated at a reference 1, and has six spark plugs (no numeral). An ignition distributor 2 has a rotatable contact which is arranged to be in contact with one of six stationary contacts respectively connected to the spark plugs, where the rotatable contact is connected to an ignition device 8 for receiving a high voltage. A rotational angle sensor 3 and a reference position sensor 4 are both incorporated in the distributor 2. The rotational angle sensor 3 comprises a signal rotor 3b, which is a toothed wheel fixed to a rotary shaft 2a of the distributor 2, and an electromagnetic pickup 3a, while the reference position sensor 4 comprises a signal rotor 4b having a projection and is fixed to the rotary shaft 2a, and an electromagnetic pickup 4a. Thus, the pickup 3a of the rotational angle sensor 3 produces twelve pulses per two revolutions of the engine crankshaft, while the pickup 4a of the reference position sensor 4 produces a single pulse during the same period.

The number of the teeth of the signal rotor 3b of the rotational angle sensor 3 is determined in accordance with the number of the cylinders as is well known. Although two electromagnetic pickups 3a and 4a are used in this embodiment of FIG. 4, pickups of other types, such as Hall elements, photo sensors or the like, may be used therefor.

The distributor shaft 2a is driven from the engine camshaft (not shown) at one-half crankshaft speed. Although it is illustrated that the six spark plugs of the engine 1 are arranged to be energized in a sequence from one end, the connection between the spark plugs and the stationary contacts of the distributor 2 may be changed from the illustrated way of connection to effect ignitions in a desired firing order.

The intake manifold, throttle valve, fuel injection valves, exhaust pipe and other necessary elements of the engine 1 are not shown for simplicity.

The output signals of the sensors 3 and 4 are respectively fed to a processing circuit 6 in which the waveforms of the output signals of the pickups 3a and 4a are respectively shaped to be fed respectively to a control device 7, such as a well known microcomputer. In this embodiment, the control device 7 is constructed of a microcomputer having a central processing unit (CPU), a memory, and an input/output device (I/O) in the same manner as customary microcomputers. The control device 7 is also responsive to a signal from a suction vacuum sensor 5, so that necessary ignition timing and energizing interval are respectively calculated in accordance with a predetermined control logic. Namely, the control device 7 emits an output signal which is then fed to the ignition device 8 having an ignition coil and an ignitor. The ignitor is driven by the output signal of the control device 7 so that a primary winding current of the ignition coil is controlled for producing a high voltage across the secondary windings of the same. The high voltage is supplied via the distributor 2 to respective spark plugs of the engine 1 in a given sequence so that the combustion takes place in turn in the respective cylinders.

Figure 5:
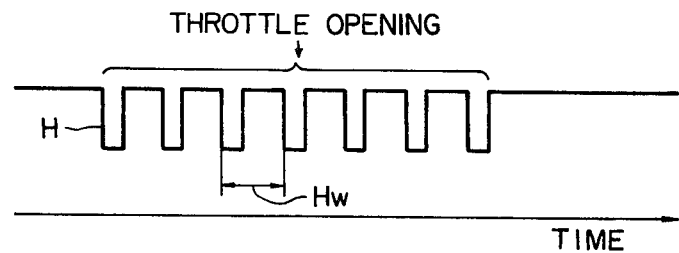
FIG. 5 is a waveform of a signal indicative of the acceleration of the engine of FIG. 4.

The above-described structure of the electronic ignition timing control device is the same as that of FIG. 1. The electronic ignition timing control device according to the present invention, however, differs from the conventional apparatus of FIG. 1 in that an acceleration sensor 9 is additionally provided. The acceleration sensor 9 per se is the same in construction as well known acceleration sensors which are used in conventional electronic fuel injection systems for an internal combustion engine. In detail, the acceleration sensor 9 comprises a comb-like conductor pattern provided on a printed circuit board and a slidable contact arranged to slide on the comb-like conductor pattern, where the slidable contact is connected to the tip of an arm which is connected to the shaft of the throttle valve of the engine 1. One of the comb-like conductor pattern and the slidable contact is fed with an electric current from a suitable power supply, so that the acceleration sensor 9 emits a pulse train signal H as the throttle valve opens on acceleration of engine 1. The waveform of the pulse train signal H is shown in FIG. 5. However, the accelerator sensor 9 is arranged not to emit such a pulse train signal H when the throttle valve is closed. The comb-like conductor pattern comprises equidistantly spaced conductors so that the pulse width $H_W$ of the pulse train signal H becomes narrower as the throttle is opened more rapidly. The pulse of the signal H will be referred to as acceleration pulses hereafter.

The output signal of the acceleration sensor 9, that is the pulse train signal H of FIG. 5, is then fed to the control device 7. The control device 7 detects the rate of acceleration from the pulse width $H_W$ of the signal H, and thus the following operation of extension of the energizing interval will be performed during acceleration of the engine 1.

Figure 6A:
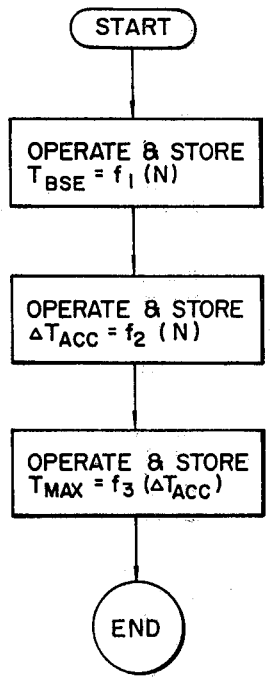
FIGS. 6A to 6C are schematic flow charts showing the operation of the device of FIG. 4.
Figure 6B:
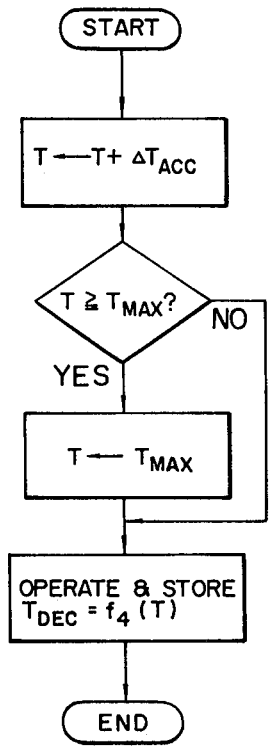
Figure 6C:
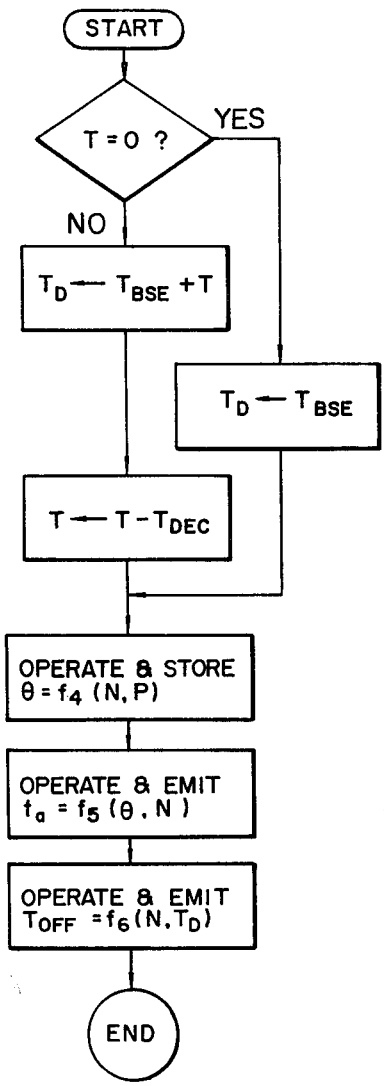

FIGS. 6A to 6C are flow charts showing various operations performed in the control device 7. The control device 7 operates the rotational speed N of the engine crankshaft from an interval required for rotating 120° CA by using the output signals of the signal processing circuit 6 in the same manner as described in connection with FIG. 1. A basic energizing interval $T_{BSE}$ is operated as a function of the engine rotational speed N as shown in FIG. 3, and then the operated interval $T_{BSE}$ is stored in a register. The basic energizing interval $T_{BSE}$ corresponds to the energizing interval characteristic curve G of FIG. 3. Namely, when the engine 1 operates in steady condition, the value of this $T_{BSE}$ will become actual energizing interval of the ignition coil. The above-mentioned step of operating and storing $T_{BSE}$ is a first step of a flow chart of FIG. 6A which shows a main routine. The main routine of FIG. 6A is normally repeated, and in the case of acceleration of the engine 1, an interrupt routine of FIG. 6B will be executed, while another interrupt routine of FIG. 6C will be executed for performing ignitions in each cylinders. After completing the interrupt routines of FIGS. 6B and 6C, the opertional flow returns to the main routine of FIG. 6A.

Figure 7:
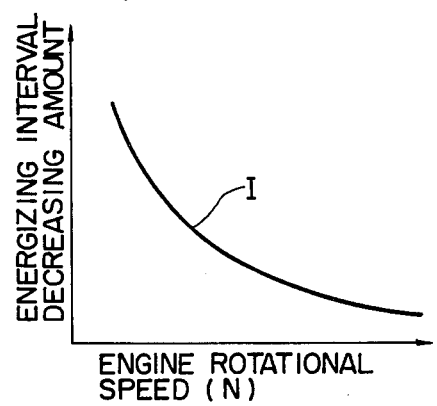

Nextly, a unit extension amount $\Delta T_{ACC}$ is operated and stored as a second step. An energizing interval decrease, i.e. $\Delta T_{ON}$ of Eqs. (10) and (11) decreases as the engine rpm N rises at the beginning of acceleration as shown by a curve I of FIG. 7. Accordingly, the value of the unit extension amount $\Delta T_{ACC}$ should be set to a value which becomes greater as the engine rotational speed N becomes smaller for the purpose of extension of the energizing interval corresponding to the energizing interval decrease $\Delta T_{ON}$ at a given rotational speed N of the engine. Nextly, an upper limit $T_{MAX}$ of the amount of extension of the energizing interval is operated and stored as a given multiple of the value of $\Delta T_{ACC}$ which is being stored at this point. This is a third step, and this third step is done for preventing the actual energizing interval from becoming excessively long because the energizing interval extension amount becomes more than the energizing interval decrease during acceleration which is caused by detecting a plurality of acceleration pulses H in the case of operating the throttle valve continuously. The value of the upper limit $T_{MAX}$ should so be limited within a smaller value as the rotational speed N of the engine 1 increases as being apparent from FIG. 3. Therefore, $T_{MAX}$ is operated as a given multiple of $\Delta T_{ACC}$ which is a function of the engine rotational speed N, so that the above requirement is met.

In this way, the basic energizing interval $T_{BSE}$, the unit extension amount $\Delta T_{ACC}$ and the upper limit $T_{MAX}$ of the energizing interval extention amount are respectively operated and stored in advance, and each time an acceleration pulse of the signal H is detected, the following operation and control of the energizing interval will be performed.

FIG. 6B shows a flow chart of an interrupt routine which is executed in response to the acceleration pulse H. A value of an energizing interval extension amount T is arranged to be stored in a register, and T is read out when the acceleration pulse H is applied to the control device 7 of FIG. 4. If the engine 1 has been operated in a steady state, the value of T read out from the register is zero. As a first step of the interrupt routine, the above-mentioned unit extension amount $\Delta T_{ACC}$ is added to T to obtain a new a value of T. The new value of the energizing interval extension amount T is compared with the above-mentioned upper limit $T_{MAX}$ of T in a following step. If T is equal to or greater than $T_{MAX}$, namely, if the answer of the second step is YES, a third step is performed to set T to $T_{MAX}$. On the other hand, if T is smaller than $T_{MAX}$, namely, if the answer of the second step is NO, the result of the addition is stored in a register as is, and then the third step is skipped to perform a following fourth step. In the fourth step, an extension interval decreasing value $T_{DEC}$ will be obtained and stored. This value $T_{DEC}$ will be used for decreasing the value of the energizing interval extension amount T each time ignition is performed.

Figure 8:
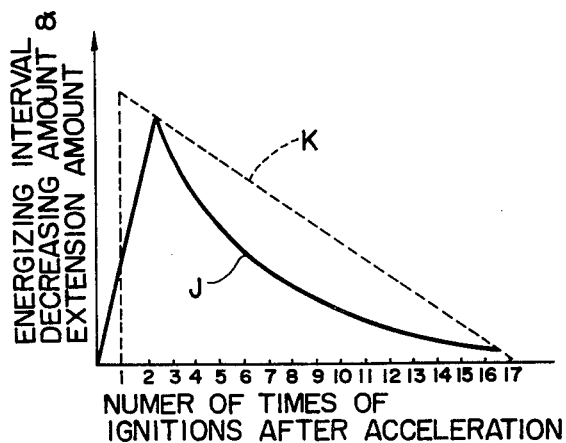

This point will be further described with reference to a graph of FIG. 8 which shows the variation in actual energizing interval decreasing amount (see solid curve J) caused by the aforementioned conventional method, and the variation in energizing interval extension amount T (see dotted curve K) both with respect to the number of times of ignitions. The above-mentioned actual energizing decreasing amount should not be confused with the extension interval decreasing value $T_{DEC}$; the former indicates the tendency of the energizing interval becoming shofter than required during acceleration when energizing interval is controlled in the conventional manner, and the latter indicates a value to be substracted from T during operation of the system according to the present invention as will be described with refernce to FIG. 6C. As seen in FIG. 8, the energizing interval decreasing amount indicated by the curve J assumes the maximum value at a second ignition after acceleration, and then its value reduces as ignitions take place one after another. In order to compensate for the energizing interval decreasing amount, which varies during acceleration, the amount of extension should also be changed accordingly. Namely, the energizing interval extension amount T has to be decreased as ignitions take place. The above-mentioned extension interval decreasing value $T_{DEC}$ is used for this purpose. The value of $T_{DEC}$ equals the energizing interval extension amount divided by a constant. In the case that the value of $T_{DEC}$ has been determined in this way, if no acceleration pulse H is detected after several acceleration pulses are applied so that the value of the energizing interal extension amount T has been set, the value of T will decrease as indicated by the dotted curve K of FIG. 8 as ignitions take place, and finally, T becomes zero so that extension of energizing interval will not be performed thereafter.

On the other hand, ignition timing and actual energizing interval will be operated by an interrupt routine of FIG. 6C so that ignitions take place in synchronizm with the rotational angle of the engine crankshaft. Namely, the interrupt routine of FIG. 6C will be executed when a given angle of the engine crankshaft is detected. For instance, the frequency of the pulse train signal A of FIG. 2, i.e. the output signal of the signal processing circuit 6 corresponding to the output signal of the pickup 3a, is divided by two so that the interrupt routine of FIG. 6C is executed at an interval corresponding to 60 degrees of the engine crankshaft rotational angle.

In a first step of the interrupt routine of FIG. 6C, it is detected whether the energizing interval extension amount T equals zero or not. If T is not zero, T is added to the basic energizing interval $T_{BSE}$ in a following second step to determine a final energizing interval $T_D$. Nextly, the energizing interval extension amount T is reduced by $T_{DEC}$ in a following step. Namely, the value of T is renewed to be restored in the register, and thus the new value of T will be used for the subsequent ignition. On the other hand, if T is zero at the instant of this interruption, the basic energizing interval $T_{BSE}$ will be used as the final energizing interval $T_D$.

After the final energizing interval $T_D$ is obtained, an advance angle $\theta$, an ignition count-down interval $t_a$ and an unenergizing interval $T_{OFF}$ will be respectively obtained in the same manner as in the conventional method as described hereinbefore. Namely, the advance angle $\theta$ will be operated as a function of the engine rotational speed N and the vacuum pressure P; the ignition count-down interval $t_a$ will be operated as a function of the advance angle $\theta$ and the engine rotational speed N; and the unenergizing interval will be operated as a function of the engine rotational speed N and the final energizing interval $T_D$. As will be understood from FIG. 2, the unenergizing interval $T_{OFF}$ becomes shorter as the final energzing interval $T_D$, which corresponds to $T_{ON}'$ of FIG. 2, gets longer, and ignition takes place at the end of the ignition count-down interval $t_a$ (see $t_{a1}$ and $t_{a2}$ of FIG. 2).

An ignitor driving pulse signal F will be produced by the control device 7 for energizing the ignition coil for an interval equal to the above-mentioned final energizing interval $T_D$. Therefore, actual energizing of the ignition coil and ignition will take place in accordance with the timing chart of FIG. 2.

Figure 9A:
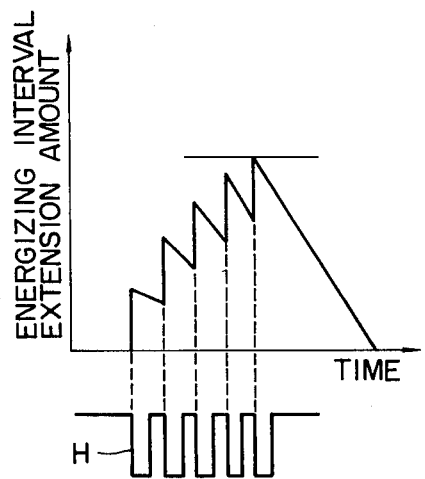
Figure 9B:
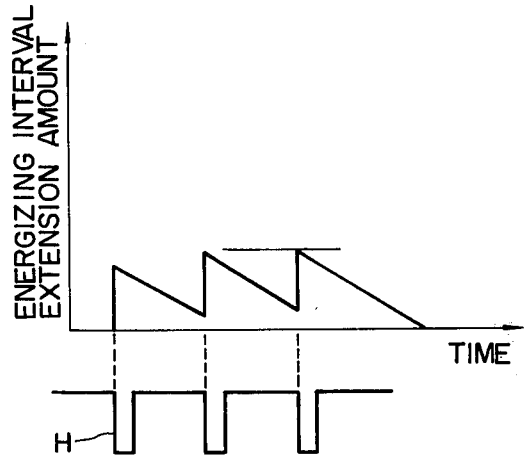

FIGS. 9A and 9B are graphical representations showing energizing intervals in the cases of rapid acceleration and slow acceleration. As shown in FIGS. 9A and 9B, each time an acceleration pulse H is detected, in this embodiment, in response to the trailing edge of each acceleration pulse H, a new energizing interval extension amount T is set by adding the above-mentioned unit extension interval $\Delta T_{ACC}$, and then the value of new T is added to the basic energizing interval $T_{BSE}$ at a given point of the rotational angle of the crankshaft so that the ignition coil is supplied with a primary current for the final energizing interval $T_D$ corresponding to the sum of $T_{BSE}$ and T for performing ignition in each cylinder. Furthermore, the value of T is reduced by $T_{DEC}$ each time T is added to $T_{BSE}$. Although the value of T is shown, for simplicity, to decrease at a given rate along slopes each time the value of T is renewed in response to the trailing edge of the acceleration pulse H, the value of T actually drops stepwise each time T is added to $T_{BSE}$. Therefore, if the accelerator pedal is operated very rapidly so that no ignition takes place between two adjacent acceleration pulses H, the value of T does not drop at this point maintaining the same value of T. In other words, if the interrupt routine of FIG. 6C is not executed during the execution of the other interrupt routine of FIG. 6B, the value of T simply rises without decreasing until the interrupt routine of FIG. 6C is executed.

Turning back to FIGS. 9A and 9B, it will be understood from the comparison between these figures that the value of T is relatively great in the case of rapid acceleration because the width and $H_W$ of the acceleration pulses H is narrow, and that, on the other hand, in the case of slow acceleration, the value of T is relatively small because the width $H_W$ of the acceleration pulses H is wide. In other words, when the shortening tendency of the energizing interval is great on rapid acceleration, the value of T is great, and on the other hand, when the shortening tendency is small on slow acceleration, the value of T is small. Consequently, the apparatus and method according to the present invention provides energizing interval in proper quantities to the ignition coil irrespective of the operating conditon of the engine.

Although it has been described in connection with the above embodiment that the value of energizing interval extension amount T is reduced by $T_{DEC}$ a plurality of times so that extension of energizing interval will finally terminate, such a value of $T_{DEC}$, i.e. extension interval decreasing value, is not necessarily required to be used. For instance, the value of T may be reduced by multiplying a given fractional number each time T is added to the basic energizing interval $T_{BSE}$. Suppose the value of the fraction is ½, the energizing interval extension amount T will reduce, after acceleration, as:

T, T/2, T/4, T/8

Moreover, such a decrease of the energizing interval extension amount T may be omitted if the control device 7 is arranged such that extension of the basic energizing interval $T_{BSE}$ is performed as many times as a given number of times of ignitions, and extension will terminate thereafter. In this case, inasmuch as the number of times of ignitions which require such an extension of energizing interval, becomes smaller as the rotational speed N of the engine 1 becomes higher, it is preferable that the given number of times of ignitions is a function of the rotational speed N of the engine 1.

Furthermore, the unit extension interval $\Delta T_{ACC}$ may not necessarily be added to T each time of detection of the acceleration pulse H. Namely, irrespectively of the number of acceleration pulses H, it can be arranged such that the energizing interval extension amount T may be set to a predetermined value once a single acceleration pulse H is detected. In this case, the predetermined value for T to be set is preferably a function of the engine rotational speed N in the same manner as in the above-described embodiment.

Although in the above-described embodiment, the engine to be controlled is an in-line six-cylinder internal combustion engine 1, various internal combustion engines can be controlled in accordance with the present inveniton if the engine is of the type arranged to perform ignition by using spark plug(s).

The above-described embodiment is just an example of the present invention, and therefore, it will be apparent for those skilled in that art that many modifications and variations may be made without departing from the spirit of the present invention. Namely, if an electronic ignition timing control device having a structure substantially the same or equivalent to that of the arrangement of FIG. 4 is used, the present invention can be adapted irrespectively of the detailed structure, sort and installing position of the various sensors.

What is claimed is:

1. A method for controlling the energizing interval of an ignition coil of an internal combustion engine equipped with an electronic control device for energizing said ignition coil, said energizing interval being determined basically on the basis of the rotational speed of said engine, said method comprising the steps of:
   generating a pulse train signal indicative of the acceleration of said engine by detecting the opening degree of a throttle valve associated with said engine such that the pulse period changes in accordance with the accelerating rate; and
   correcting said energizing interval by adding thereto an extension amount which is either a function of said rotational speed of said engine or a given upper limit value at said rotational speed of said engine in response to each pulse of said pulse train signal such that said extension amount is increased by a predetermined value in esponse to each pulse of said pulse train signal, while said extension amount is decreased in accordance with lapse of time at an interval between two consecutive pulses of said pulse train signal.

2. A method for controlling energizing interval as claimed in claim 1, characterized in that said addition of said extension amount is performed at an interval determined by the degree of acceleration of said engine.

3. A method for controlling energizing interval as claimed in claim 2, characterized in that said extended energizing interval is reduced by a value each time said energizing interval extension amount is added to said basic energizing interval.

4. A method for controlling energizing interval as claimed in claim 3, characterized in that said value is a function of said energizing interval extension amount.

5. A method for controlling energizing interval as claimed in claim 2, characterized in that said extended energizing interval is multiplied by a fractional number each time said energizing interval extension amount is added to said basic energizing interval.

6. A method for controlling energizing interval as claimed in claim 2, characterized in that said addition is performed as long as said engine is in accelerating condition.

7. A method for controlling energizing interval as claimed in claim 1, characterized in that said addition is performed for a given number of times, which is a function of said rotational speed of said engine.

8. A method for controlling the energizing interval of an ignition coil of an internal combustion engine equipped with an electronic control device for energizing said ignition coil, comprising the steps of:
   (a) detecting the rotational speed of said engine;
   (b) detecting the angular position of a crankshaft of said engine;
   (c) operating a basic energizing interval as a function of said rotational speed of said engine;
   (d) operating a unit extension amount as a function of said rotational speed of said engine;
   (e) operating an upper limit of an energizing interval extension amount as a function of said unit extension amount;
   (f) storing said basic energizing interval, said unit extension amount, said upper limit and a variable as the energizing interval extension amount which is originally zero, in registers;

(g) detecting the accelerating condition of said engine;

(h) adding said unit extension amount, when said accelerating condition is detected, by reading out the same from said register to the energizing interval extension amount read out from said register to renew said energizing interval extension amount;

(i) checking whether said energizing interval extension amount is greater than said upper limit or not;

(j) registering said upper limit as said energizing interval extension amount in the case that said energizing interval extension amount is equal to or greater than said upper limit, or registering said energizing interval extension amount renewed in the case that said energizing interval extension amount is smaller than said upper limit;

(k) operating an extension interval decreasing value as a function of said energizing interval extension amount which has been read out from said register;

(l) checking whether the value of said energizing interval extension amount equals zero or not when said crankshaft of said engine assumes a given angular position;

(m) adding said energizing interval extension amount to said basic energizing interval to obtain a final energizing interval in the case that said energizing interval extension amount is greater than zero, or setting said final energizing interval to said basic energizing interval in the case that said energizing interval extension amount equals zero; and (n) reducing the amount of said energizing interval extension amount by said extension interval decreasing value to renew said energizing interval extension amount if said final energizing interval has been obtained by adding said energizing interval extension amount to said basic energizing interval.

9. Apparatus for controlling the energizing interval of an ignition coil of an internal combustion engine equipped with an electronic control device for energizing said ignition coil, said energizing interval being determined basically on the basis of the rotational speed of said engine, said apparatus comprising:

(a) means for detecting the accelerating condition of said engine, said means having a pulse generator for producing a pulse train signal indicative of the acceleration of said engine by detecting the opening degree of a throttle valve associated with said engine such that the pulse period changes in accordance with the accelerating rate; and (b) means for correcting said energizing interval by adding thereto an extension amount which is either a function of said rotational speed of said engine or a given upper limit value at said rotational speed of said engine in response to each pulse of said pulse train signal such that said extension amount is increased by a predetermined value in response to each pulse of said pulse train signal, while said extension amount is decreased in accordance with lapse of time at an interval between two consecutive pulses of said pulse train signal.

10. Apparatus for controlling the energizing interval of an ignition coil of an internal combustion engine equipped with an electronic control device for energizing said ignition coil, said energizing interval being determined basically on the basis of the rotational speed of said engine, said apparatus comprising:

(a) means for detecting the rotational speed of said engine;

(b) means for detecing the angular position of a crankshaft of said engine;

(c) means for operating a basic energizing interval as a function of said rotational speed of said engine;

(d) means for operating a unit extension amount as a function of said rotational speed of said engine;

(e) means for operating an upper limit of an energizing interval extension amount as a function of said unit extension amount;

(f) means for storing said basic energizing interval, said unit extension amount, said upper limit and a variable as the energizing interval extension amount which is originally zero, in registers;

(g) means for detecting the accelerating condition of said engine;

(h) means for adding said unit extension amount, when said accelerating condition is detected, by reading out the same from said register to the energizing interval extension amount read out from said register to renew said energizing interval extension amount;

(i) means for checking whether said energizing interval extension amount is greater than said upper limit or not;

(j) means for registering said upper limit as said energizing interval extension amount in the case that said energizing interval extension amount is equal to or greater than said upper limit, or registering said energizing interval extension amount renewed in the case that said energizing interval extension amount is smaller than said upper limit;

(k) means for operating an extension interval decreasing value as a function of said energizing interval extension amount which has been read out from said register;

(l) means for checking whether the value of said energizing interval extension amount equals zero or not when said crankshaft of said engine assumes a given angular position;

(m) means for adding said energizing interval extension amount to said basic energizing interval to obtain a final energizing interval in the case that said energizing interval extension amount is greater than zero, or setting said final energizing interval to said basic energizing interval in the case that said energizing interval extension amount equals zero; and (n) means for reducing the amount of said energizing interval extension amount by said extension interval decreasing value to renew said energizing interval extension amount if said final energizing interval has been obtained by adding said energizing interval extension amount to said basic energizing interval.

11. Apparatus as claimed in claim 10, wherein said means for detecting the accelerating condition of said engine comprises a sensor which detects the movement of a throttle valve of said engine.

* * * * *